United States Patent
Ghadyani

(10) Patent No.: US 10,697,867 B2
(45) Date of Patent: Jun. 30, 2020

(54) APPARATUS AND METHOD FOR AUTOMATIC GRAVIMETRIC SAMPLING OF CHEMICAL SOLIDS

(71) Applicant: Mohammad Ghadyani, Tehran (IR)

(72) Inventor: Mohammad Ghadyani, Tehran (IR)

( * ) Notice: Subject to any disclaimer, the term of this patent is extended or adjusted under 35 U.S.C. 154(b) by 12 days.

(21) Appl. No.: 16/124,191

(22) Filed: Sep. 7, 2018

(65) Prior Publication Data

US 2019/0120732 A1 Apr. 25, 2019

(51) Int. Cl.
*G01N 1/28* (2006.01)
*B02C 19/08* (2006.01)

(52) U.S. Cl.
CPC .......... *G01N 1/286* (2013.01); *B02C 19/08* (2013.01); *G01N 2001/2866* (2013.01)

(58) Field of Classification Search
CPC .. G01N 1/286; G01N 2001/2866; B02C 1/00; B02C 1/005; B02C 1/12; B02C 19/08
See application file for complete search history.

(56) References Cited

U.S. PATENT DOCUMENTS

| | | | |
|---|---|---|---|
| 3,450,355 A * | 6/1969 | Murphy | B02C 19/08 241/46.01 |
| 3,524,599 A * | 8/1970 | Joachim-Gunter Heilenz | B01F 7/26 241/199.7 |
| 5,107,945 A | 4/1992 | DeWees | |
| 5,583,304 A | 12/1996 | Kalidindi | |
| 5,855,232 A | 1/1999 | Oda et al. | |
| 6,021,821 A | 2/2000 | Wegman | |
| 6,121,556 A * | 9/2000 | Cole | G01G 13/04 141/83 |
| 6,517,561 B1 * | 2/2003 | Phillips | G01N 1/286 606/180 |
| 6,674,022 B2 | 1/2004 | Fermier et al. | |
| 9,962,717 B1 * | 5/2018 | Micic | B04B 5/0421 |
| 2011/0174552 A1 | 7/2011 | Ahmed | |

* cited by examiner

*Primary Examiner* — Justin N Olamit
(74) *Attorney, Agent, or Firm* — NovoTechIP International PLLC

(57) ABSTRACT

An improved apparatus and method for sampling of solids with flexibility to sampling weight and granular size comprises, in one implementation, a sample holder, a grinding unit, a linking channel, a structural support unit and a control unit. The linking channel is arranged to connect the sample holder to the grinding unit. The grinding unit includes a grinding container and a grinding rod with a blade at a bottom end, and is configured to automatically grind a solid specimen. The structural support unit is configured to provide system stability and to protect the control unit from outside. The control unit includes a switch, a regulating module, an actuator motor, a rotational plate, a lever beam and an electronic board, and is configured to regulate automatic weighing and grinding of the solid specimen. The switch is configured to START/END grinding and to send signals to the electronic board to stay ON/OFF during sampling, and the regulating module is configured to adjust voltage of the actuator motor consistent with weight of the solid specimen. The control unit is also arranged to be distant from the grinding unit to prevent direct contact between a user and the solid specimen during sampling when dealing with a hazardous specimen.

19 Claims, 6 Drawing Sheets

APPARATUS AND METHOD FOR AUTOMATIC GRAVIMETRIC SAMPLING OF CHEMICAL SOLIDS

CROSS REFERENCE TO RELATED APPLICATION

This application claims the benefit of priority to Iran Application Serial Number 139650140003007008, filed on Sep. 7, 2017, the entire content of which is incorporated herein by reference.

TECHNICAL FIELD

The present disclosure relates generally to sampling solids and, more particularly, to automatic gravimetric sampling of solids with flexibility to sampling weight and granular size.

BACKGROUND

One of the most fundamental routines in a chemical laboratory is to prepare samples from dry powdered materials. Often times, conventional powder dispensing systems are designed around the assumption that a relatively large amount of powder is available for automatic sampling. These conventional systems include screw, rotary, vibratory, roll, shaker and revolving plate feeders where the designs of such systems are mainly focused on a large quantity of bulk powder materials to be continually dispensed into feed lines or vials. As such, these automatic devices are not generally designed to be used in dispensing of a small quantity of powder materials or in situations where powder materials are maintained within a small vial. Moreover, the absence of an automatic grinder in these conventional setups makes it even more difficult to perform sampling of granular bulk materials with different granular sizes since there is no automatic system available to grind such granular bulk materials into powders prior to sampling.

Furthermore, almost all errors in sampling process are associated with human or pre-analytical processing errors where preparation and adjusting sampling by hand permit upfront human error in wasting and contaminating materials to occur at various sample collection sites and laboratories. As such, the entire process can lead to increase in sampling time and labor intensity, and thus cost inefficiency.

With all these shortcomings, there remains a need to develop an improved automatic gravimetric sampling device that provides an easier and more efficient means for weighing and grinding solid specimen of all kinds and all measures without being limited to a specific and predetermined weight and granular size, while maintaining satisfactory accuracy and safety as well as being timely and cost effective. Such device can also prevent a working environment from being contaminated and avoid individuals from being subjected to prolong exposure to hazardous chemicals.

Accordingly, the present disclosure addresses providing an improved apparatus and method for automatic gravimetric sampling solids with flexibility to sampling weight and granular size, while offering a safe and reliable sampling process in a timely and cost-effective fashion.

SUMMARY

In one general aspect, described is an improved apparatus for automatic gravimetric sampling of solids with flexibility to sampling weight and granular size. In one implementation, the apparatus for automatic gravimetric sampling of solids may include a sample holder, a grinding unit, a linking channel, a structural support unit and a control unit. The sample holder may include a first and a second end, and can be configured to maintain the solid specimen. The grinding unit may include a top and a bottom end, and can be configured to automatically grind the solid specimen. The linking channel may extend from the second end of the sample holder to the top end of the grinding unit, and can be configured to transfer the solid specimen from the sample holder to the grinding unit. The structural support unit may be configured to provide structural stability to the sampling apparatus. The control unit may be in contact with the grinding unit and secured to the structural support unit, and can be configured to regulate automatic weighing and grinding of the solid specimen.

In an aspect, the sample holder may include a sample container and a cap. The cap may be connected to the sample container from one end and to the linking channel from another end, and can be configured to seal connection of the sample container to the linking channel.

In a related aspect, the grinding unit may include a grinding rod and a grinding container. The grinding rod may be in contact with the grinding container from a bottom end and connected to the control unit from a top end, and can be configured to grind the solid specimen inside the grinding container. The grinding rod may include a blade at the bottom end, and can be configured to crush the solid specimen from granular to powder. The linking channel may include an opening, which can be arranged to allow the grinding rod to pass through and to limit air interaction during transferring of the solid specimen from the sample holder to the grinding unit.

In a further aspect, the structural support unit may include a supporting frame, a supporting rod and a structural cover. The supporting frame may extend between a top and a bottom end of the structural support unit. The supporting rod may be connected to the supporting frame from one end and to the grinding rod from another end. The supporting rod may be arranged to secure the grinding rod to maintain linear motion. The structural cover may be connected to the top end of the structural support unit, and can be arranged to surround and protect the control unit. The structural cover can be made of nonconductive materials to provide safety to a user and avoid direct contact with the control unit during sampling. The structural cover may also be arranged to be distant from the grinding unit to prevent direct contact between a user and the solid specimen during sampling when dealing with a hazardous specimen.

In a related aspect, the control unit may include a switch, a regulating module, an actuator motor, a rotational plate, a lever beam and an electronic board. The switch may include an ON and an OFF key, and can be connected to START and END grinding and dispensing of the solid specimen. The regulating module may be configured to adjust voltage of the actuator motor consistent with weight of the solid specimen. The lever beam may be connected to the rotational plate surrounding the actuator motor from a first end and to the top end of the grinding rod from a second end, and can be configured to transform rotational motion of the rotational plate into linear motion of the grinding rod to automatically grind the solid specimen. The electronic board may include a light source that can be controlled to stay on so as to keep a user alerted while collecting the sample specimen to avoid human errors and to add procedural safety during sampling.

In another general aspect, described is an improved method of automatic gravimetric sampling of solids with flexibility to sampling weight and granular size. In one implementation, the method of automatic gravimetric sampling for a solid specimen may include the steps of calibrating a regulating module based on a base voltage of an actuator motor in which the regulating module may be in contact with the actuator motor and secured to a supporting frame of a structural support unit.

In an aspect, the method of automatic gravimetric sampling of solids may include scaling a timer of the regulating module from the prior calibration. The method of automatic gravimetric sampling of solids may also include adjusting the timer to a desired weight of the solid specimen for sampling.

In a related aspect, the method of automatic gravimetric sampling of solids may include attaching a sample holder containing the solid specimen to a linking channel in which the linking channel can be sealed to a cap of the sample holder from one end and to a grinding unit from another end, and the grinding unit may include a grinding rod and a grinding container. The method of automatic gravimetric sampling of solids may also include inverting the sampling holder to allow the solid specimen to be transferred to the grinding container through the linking channel.

In a further aspect, the method of automatic gravimetric sampling of solids may include grinding the solid specimen inside the grinding container with a blade at a bottom end of the grinding rod by turning on a switch in which the grinding rod may be in contact with the grinding container from the bottom end and connected to a lever beam from a top end, and the lever beam may be connected to a rotational plate surrounding the actuator motor, and can be configured to transform rotational motion of the rotational plate into linear motion of the grinding rod.

In a related aspect, the method of automatic gravimetric sampling of solids may include controlling the grinding of the solid specimen by turning ON/OFF the switch where the switch may be in contact with the regulating module and the actuator motor, and secured to the supporting frame. The method of automatic gravimetric sampling of solids may also include cleaning the sample holder, the grinding unit and the linking channel with distilled water after each sampling use to prevent chemical reactions with the solid specimen.

The foregoing and other objects, features, aspects, and advantages of the present invention will become more apparent from the following detailed description of the present application when taken in conjunction with the accompanying drawings.

BRIEF DESCRIPTION OF THE DRAWINGS

Features of the subject technology are set forth in the appended claims. However, for purpose of explanation, several implementations of the subject technology are set forth in the following figures.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings. As part of the description, some of this disclosure's drawings represent structures and devices in block diagram form in order to avoid obscuring the invention. In the interest of clarity, not all features of an actual implementation are described in this specification. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the invention, and multiple references to "one embodiment" or "an embodiment" should not be understood as necessarily all referring to the same embodiment.

Figure 1:
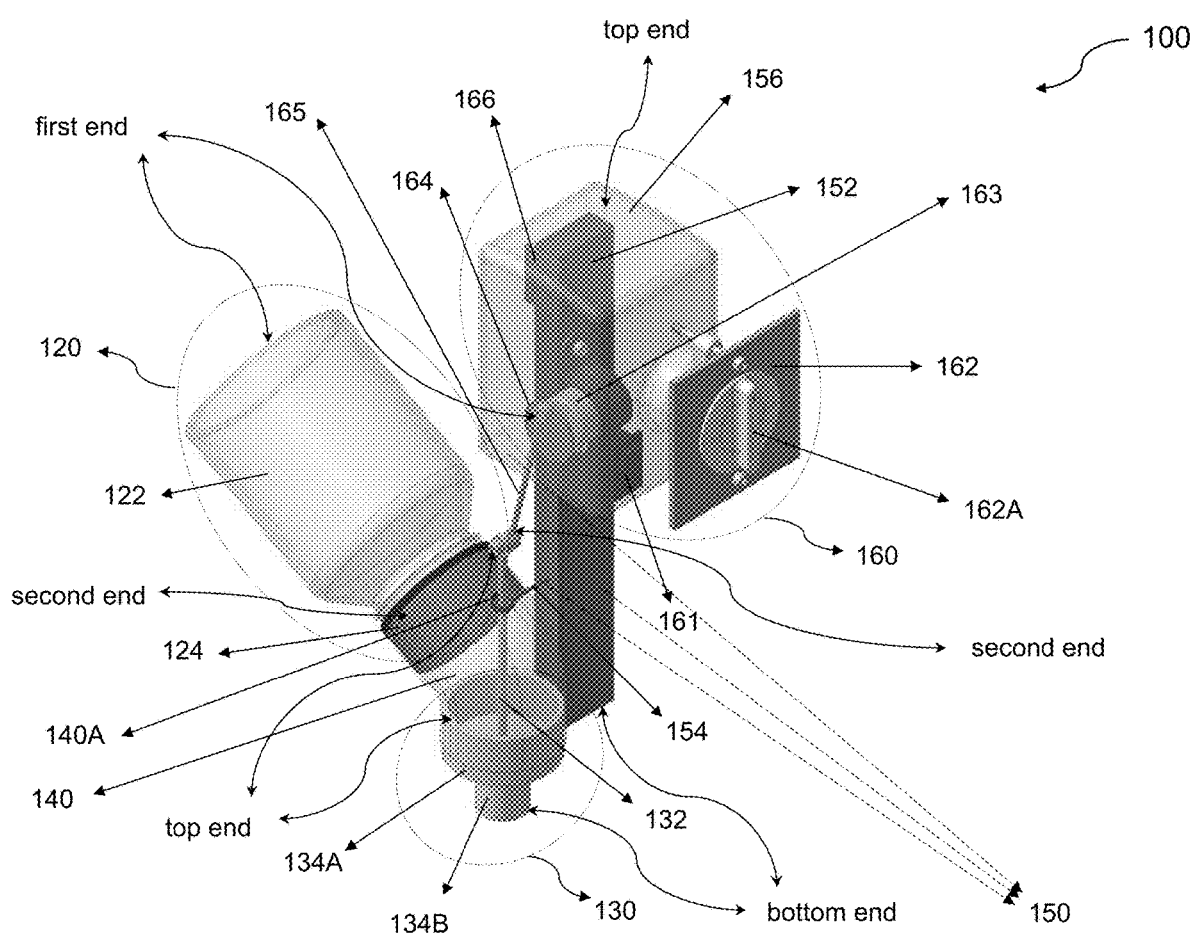
FIG. 1. is an exemplary perspective view of an improved solid sampling device for providing an improved method of sampling with flexibility to sampling weight and granular size, in accordance with one or more implementations.

A solution is proposed herein to resolve the above-motioned issues and others by providing an improved apparatus and method of automatic gravimetric sampling of solids with flexibility to sampling weight and granular size. Principles of the present invention will now be described in detail with reference to the examples illustrated in the accompanying drawings and discussed below. To safely grind and dispense sample solids at high precision and fast speed, an improved sampling machine and process, in accordance with aspects of the invention, is described herein. FIG. 1 is a perspective view of the improved apparatus and method for sampling of solids that can be configured to weigh and grind a solid specimen 110. In this exemplary embodiment, the improved automatic gravimetric sampling machine 100 (hereinafter "system 100") may include a sample holder 120, a grinding unit 130, a linking channel 140, a structural support unit 150 and a control unit 160. In one implementation, the sample holder 120 as shown may include a first and a second end, and can be configured to maintain the solid specimen 110. The grinding unit 130 may include a top and a bottom end, and can be configured to automatically grind the solid specimen 110. The linking channel 140 may extend from the second end of the sample holder 120 to the top end of the grinding unit 130, and can be configured to transfer the solid specimen 110 from the sample holder 120 to the grinding unit 130. The structural support unit 150 may be configured to provide structural stability to the system 100. The control unit 160 may be in contact with the grinding unit 130 and secured to the structural support unit 150, and can be configured to regulate automatic weighing and grinding of the solid specimen 110.

In one implementation, the sample holder 120 may include a sample container 122 and a cap 124. The cap 124 may be connected to the sample container 122 from one end and to the linking channel 140 from another end, and can be configured to seal connection of the sample container 122 to the linking channel 140. In an aspect, the cap 124 may be adjusted according to a size of the second end of the sample holder 120 to entirely seal connection between the sample container 122 and the linking channel 140.

In one implementation, the grinding unit 130 may include a grinding rod 132 and a grinding container 134. The grinding rod 132 may be in contact with the grinding container 134 from a bottom end and connected to the control unit 160 from a top end, and can be configured to grind the solid specimen 110 inside the grinding container 134. The grinding rod 132 may include a blade 132A at the bottom end, and can be configured to crush the solid specimen 110 from granular to powder. In an aspect, the grinding rod 132 may be arranged with different blades consistent with a desired powder size of the solid specimen 110.

In one implementation, the grinding container 134 may include a container 134A and an outlet channel 134B in which the container 134A can be attached to the linking channel 140 from one end and to the outlet channel 134B from another end, and can be configured to hold the solid specimen 110 while being grinded. The outlet channel 134B may be in contact with the blade 132A of the grinding rod 132 from one end and with an output sampling container from another end, and can be configured to allow the blade 132A to pass through when a switch 161 of the control unit 160 is on.

In one implementation, the linking channel 140 may include an opening 140A, which can be arranged to allow the grinding rod 132 to pass through and to limit air interaction during transferring of the solid specimen 110 from the sample holder 120 to the grinding unit 130. In an aspect, the linking channel 140 can be made of flexible materials to seal connection of the sample holder 120 to the grinding unit 130 from air interaction and to prevent waste and contamination of the solid specimen 110. Distilled water may be used to clean the sample holder 120, the grinding unit 130 and the linking channel 140 after each sampling use to prevent chemical reactions with the solid specimen 110.

In one implementation, the structural support unit 150 may include a supporting frame 152, a supporting rod 154 and a structural cover 156. The supporting frame 152 may extend between a top and a bottom end of the structural support unit 150. The supporting rod 154 may be connected to the supporting frame 152 from one end and to the grinding rod 132 from another end. The supporting rod 154 may be arranged to secure the grinding rod 132 to maintain linear motion. The structural cover 156 may be connected to the top end of the structural support unit 150, and can be arranged to surround and protect the control unit 160. In an aspect, the structural cover 156 can be made of nonconductive materials, and may be configured to provide safety to a user and avoid direct contact with the control unit 160 during sampling. In a related aspect, the structural cover 156 may be arranged to be distant from the grinding unit to prevent direct contact between a user and the solid specimen 110 during sampling when dealing with a hazardous specimen.

In one implementation, the control unit 160 may include the switch 161, a regulating module 162, an actuator motor 163, a rotational plate 164, a lever beam 165 and an electronic board 166. The lever beam 165 may be connected to the rotational plate 164 surrounding the actuator motor 163 from a first end and to the top end of the grinding rod 132 from a second end, and can be configured to transform rotational motion of the rotational plate 164 into linear motion of the grinding rod 132 to automatically grind the solid specimen 110.

In one implementation, the regulating module 162 may be in contact with the actuator motor 163 through electrical wires to send regulating signals thereto. The regulating module 162 may include a timer 162A, and can be configured to operate based on a desired amount of the solid specimen 110. The timer 162A may be adjusted based on a conversion between time and weight, according to the following equation, to display the desired amount of the solid specimen 110 in weight.

$$M = \frac{\text{weight of the solid specimen}}{\text{time}} \quad (1)$$

In equation (1), M represents an amount of the solid specimen 110 exiting from the system 100 in form of powder and in unit of weight at a given time. In an aspect, the timer 162A can be of different types, such as a mechanical and a digital timer.

In one implementation, the regulating module 162 can be configured to adjust voltage of the actuator motor 163 consistent with weight of the solid specimen 110. Calibration of the regulating module 162 can be performed once prior to sampling to determine a base voltage for the actuator motor 163. The base voltage may be obtained to avoid changing calibration of the regulating module 162 for different solid specimens with different weights and granular sizes. In an aspect, the actuator motor 163 may be arranged to function with a voltage range between, e.g., 7.5 to 24 v and an accuracy range between, e.g., 0.005 to 0.008 gr.

In one implementation, the switch 161 may include an ON and an OFF key, and can be connected to START and END grinding and dispensing of the solid specimen 110. In an aspect, the switch 161 may be arranged to equip a user to control and immediately stop grinding and dispensing of the solid specimen 110 in an emergency situation. The electronic board 166 may be in contact with the actuator motor 163, and may include a light source controlled to stay on and thereby keep a user alerted while grinding the solid specimen 110 to avoid upfront human errors and to add procedural safety during sampling.

Figure 2A:
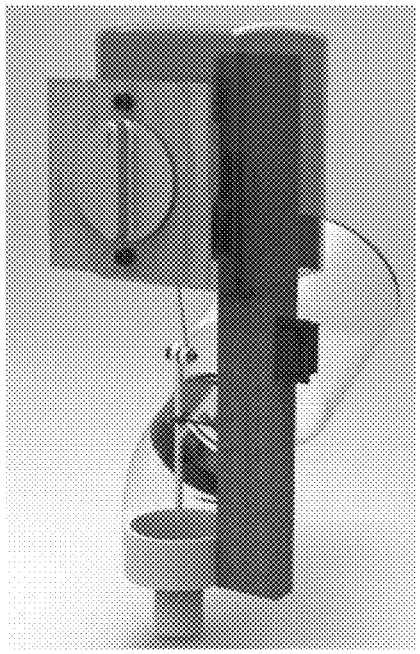
FIG. 2A and FIG. 2B show the improved solid sampling device viewed from different spatial perspectives.
Figure 2B:
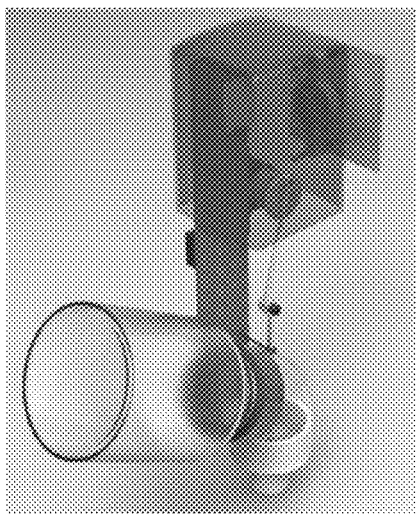

FIG. 2A and FIG. 2B show the system 100 viewed from different spatial perspectives.

Figure 3:
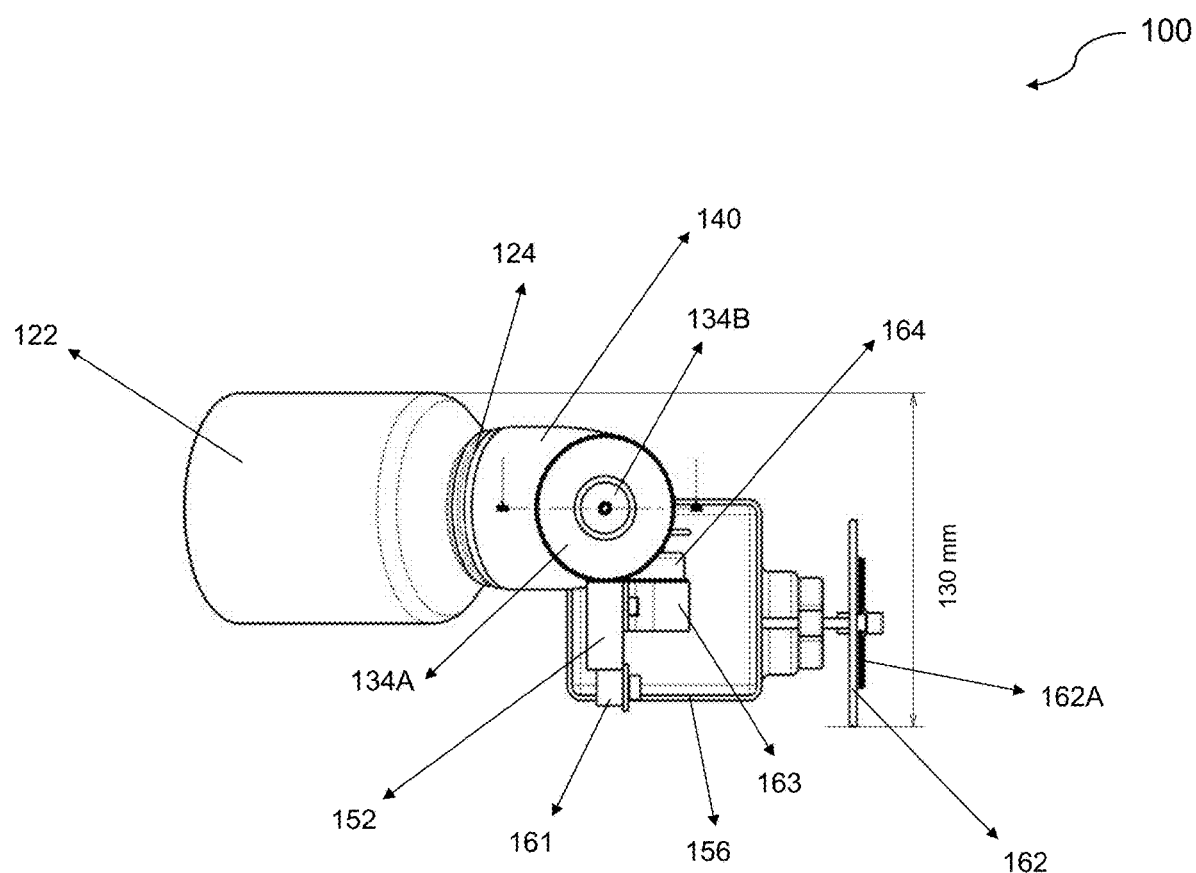
FIG. 3 shows the improved solid sampling device viewed from a bottom perspective.

FIG. 3 shows the system 100 viewed from a bottom perspective. Depicted are the sample container 122 and the cap 124 of the sample holder 120; the container 134A and the outlet channel 134B of the grinding container 134 of the grinding unit 130; the linking channel 140; the supporting frame 152 and the structural cover 156 of the structural support unit 150; and the switch 161, the regulating module 162, the timer 162A of the regulating module 162, the actuator motor 163 and the rotational plate 164 of the control unit 160. As one example, specific dimensions for the arrangement of these components of the system 100 from the bottom view are shown in FIG. 3.

Figure 4:
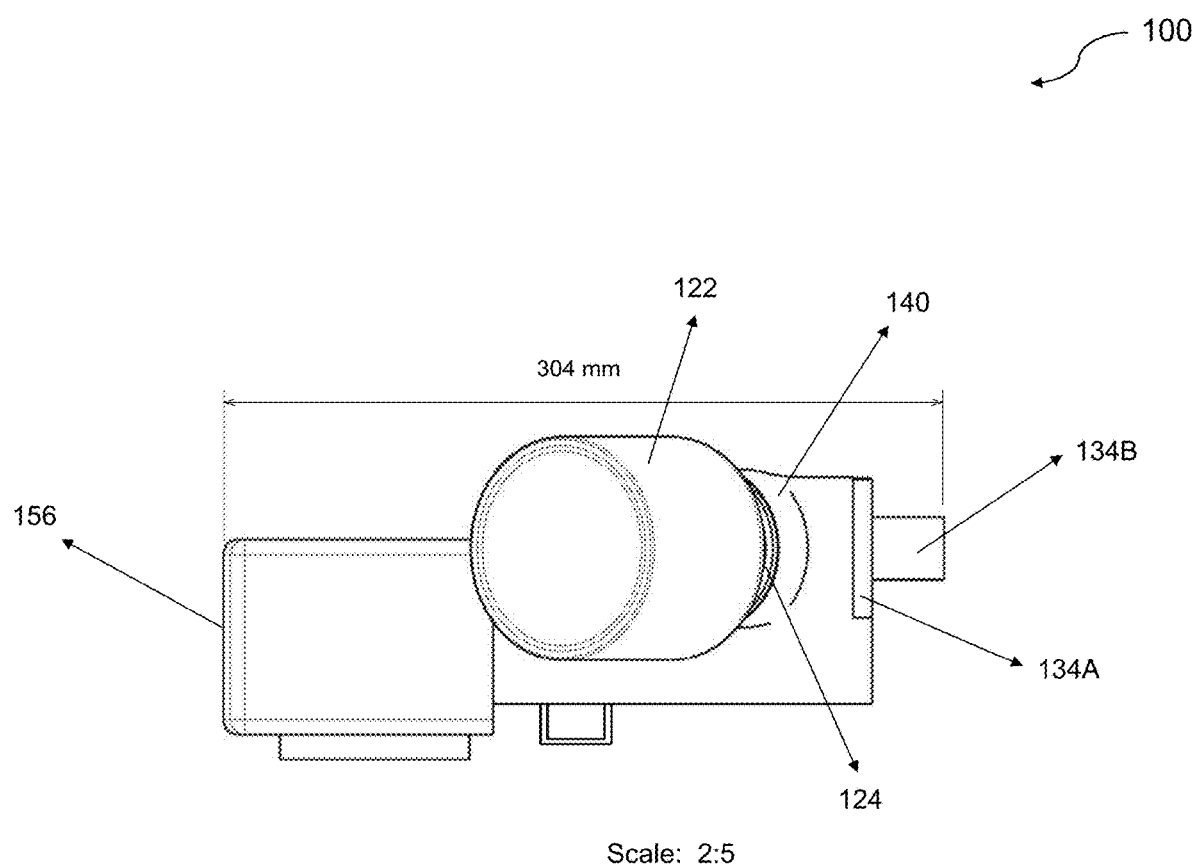
FIG. 4 shows the improved solid sampling device viewed from a side perspective.

FIG. 4 is a side view of the system 100, showing the sample container 122 and the cap 124 of the sample holder 120; the container 134A and the outlet channel 134B of the grinding container 134 of the grinding unit 130; the linking channel 140; and the structural cover 156 of the structural support unit 150. As one example, specific dimensions for the arrangement of these components of the system 100 from the side view are shown in FIG. 4.

Figure 5:
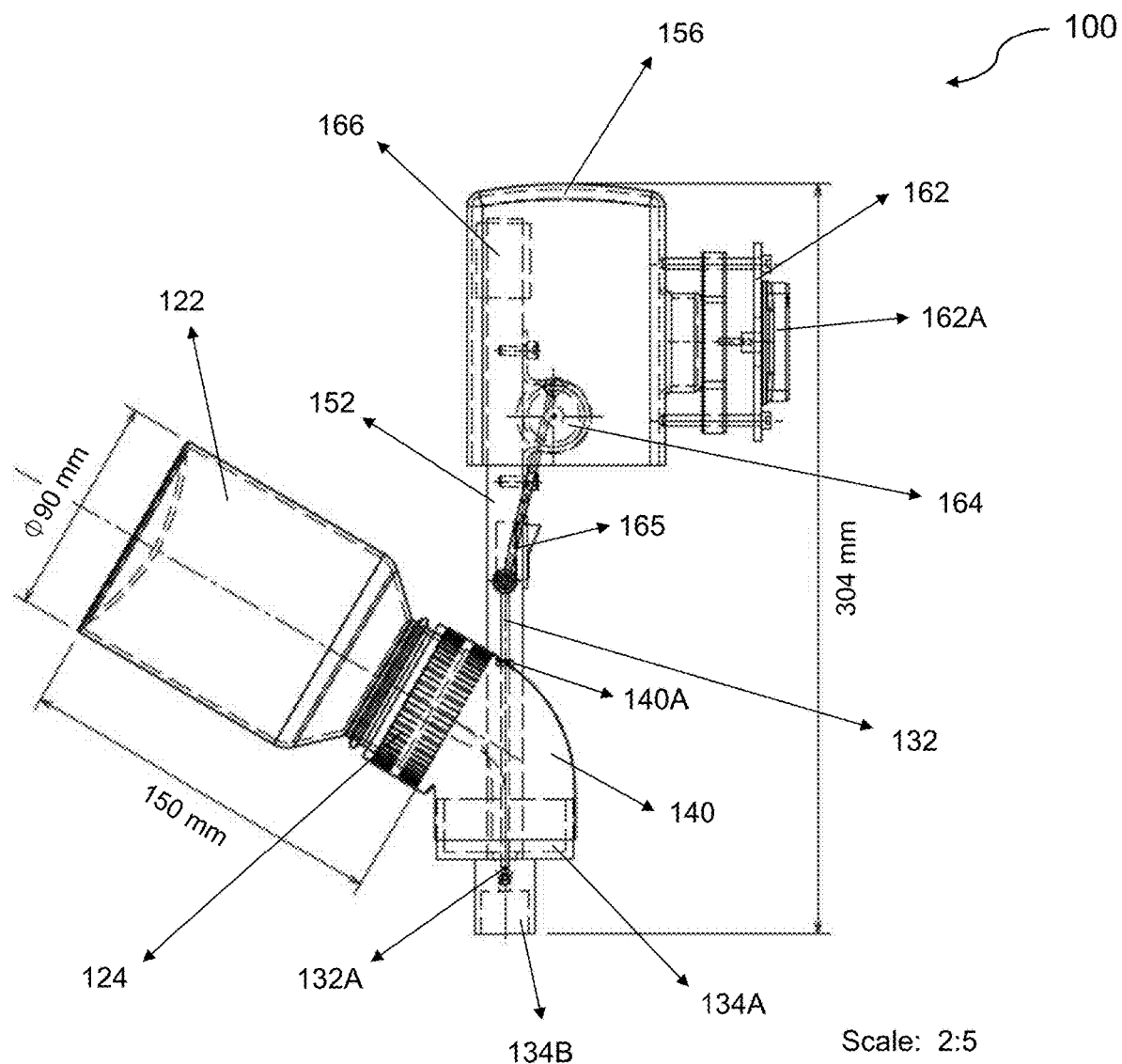
FIG. 5 shows the improved solid sampling device viewed from another side perspective.

FIG. 5 is another side view of the system 100. Depicted are the sample container 122 and the cap 124 of the sample holder 120; the grinding rod 132, the blade 132A of the grinding rod 132, the container 134A and the outlet channel 134B of the grinding container 134 of the grinding unit 130; the linking channel 140 and the opening 140A of the linking channel 140; the supporting frame 152 and the structural cover 156 of the structural support unit 150; and the regulating module 162, the timer 162A of the regulating module 162, the rotational plate 164, the lever beam 165 and the electronic board 166 of the control unit 160. As one example, specific dimensions for the arrangement of these components of the system 100 from the side view are shown in FIG. 5.

Figure 6A:
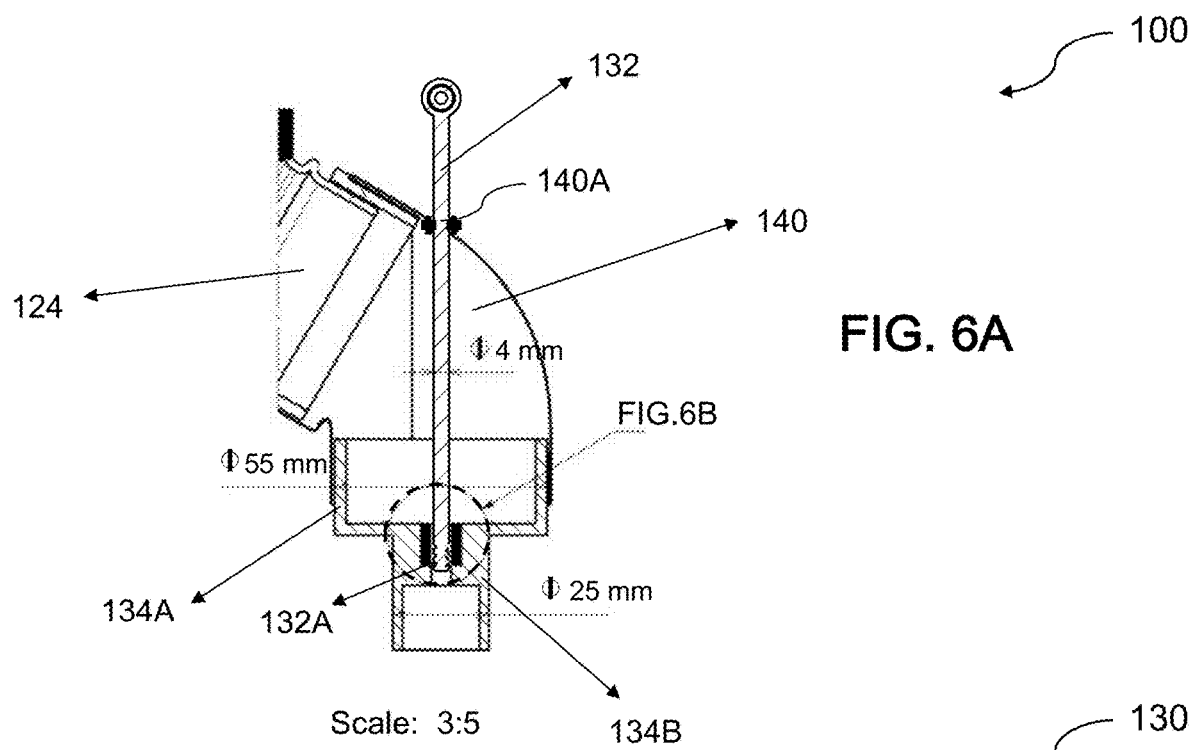
FIG. 6A shows a portion of the improved solid sampling device viewed from a side perspective.

FIG. 6A shows a portion of the system 100 viewed from a side view. Shown are the cap 124 of the sample holder 120; the grinding rod 132, the blade 132A of the grinding rod 132, the container 134A and the outlet channel 134B of the grinding container 134 of the grinding unit 130; and the linking channel 140 and the opening 140A of the linking channel 140. As one example, specific dimensions for the arrangement of these components of the portion of the system 100 from the side view are shown in FIG. 6A.

Figure 6B:
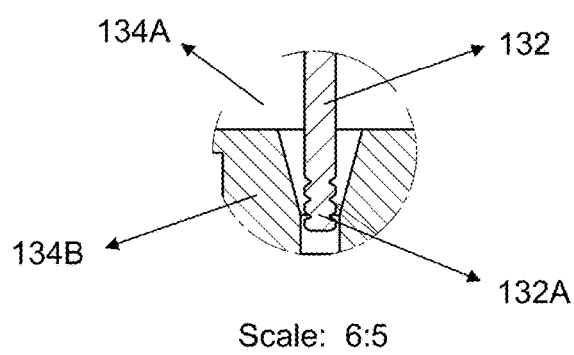
FIG. 6B is a side view of a grinding unit used in the improved solid sampling device.

FIG. 6B is a side view of a grinding unit 130 of the system 100, showing the grinding rod 132, the blade 132A of the grinding rod 132, the container 134A and the outlet channel 134B of the grinding container 134 of the grinding unit 130. As one example, specific dimensions for the arrangement of these components of the grinding unit 130 of the system 100 from the side view are shown in FIG. 6B.

Accordingly, the improved apparatus and method for solid sampling device in the present invention can provide an efficient mechanism to weigh and grind the solid specimen with flexibility to sampling weight in consistent with granular size of the solid specimen. Also, the solid sampling device can provide an efficient mechanism to safely collect chemical solid specimen as well as to safely dispense the collected specimen in a simple, timely and cost-effective fashion. Moreover, the solid sampling process may be arranged with a precision of, e.g., 0.03 gr to avoid procedural errors, such as human errors. As a result of the discussed advantages, the solid sampling device described herein, may be not limited to a specific setting, and can be used in a variety of fields, such as a chemical/medical laboratory as well as an industrial setting.

The separation of various components in the examples described above should not be understood as requiring such separation in all examples, and it should be understood that the described components and systems can generally be integrated together in a single packaged into multiple systems.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various implementations for the purpose of streamlining the disclosure. This method of disclosure is not to be interpreted as reflecting an intention that the claimed implementations require more features than are expressly recited in each claim. Rather, as the following claims reflect, inventive subject matter lies in less than all features of a single disclosed implementation. Thus, the following claims are hereby incorporated into the Detailed Description, with each claim standing on its own as a separately claimed subject matter.

What is claimed is:

1. An apparatus for automatic gravimetric sampling of a solid specimen, comprising:
    a sample holder having a first end and a second end;
    a grinding unit having a top end and a bottom end, and configured to automatically grind the solid specimen;
    a linking channel extending from the second end of the sample holder to the top end of the grinding unit, and configured to transfer the solid specimen from the sample holder to the grinding unit;
    a structural support unit; and
    a control unit in contact with the grinding unit and secured to the structural support unit, and configured to regulate automatic weighing and grinding of the solid specimen;
    wherein:

the sample holder includes a sample container and a cap, and the cap is connected to the sample container and to the linking channel, and configured to seal connection of the sample container to the linking channel, the grinding unit includes a grinding rod and a grinding container, and the grinding rod is in contact with the grinding container from a bottom end and connected to the control unit from a top end, and configured to grind the solid specimen inside the grinding container, the structural support unit includes a supporting frame, a supporting rod and a structural cover, and the supporting frame extends between a top and a bottom end of the structural support unit, and the supporting rod is connected to the supporting frame from one end of the supporting rod and to the grinding rod from another end of the supporting rod, and the structural cover is connected to the top end of the structural support unit and arranged to surround and protect the control unit, and the control unit includes a switch, an actuator motor, a rotational plate and a lever beam, and the lever beam is connected to the rotational plate surrounding the actuator motor from a first end and to the top end of the grinding rod from a second end, and configured to transform rotational motion of the rotational plate into linear motion of the grinding rod to automatically grind the solid specimen.

2. The apparatus of claim 1, wherein the cap is sized according to a size of the second end of the sample holder to entirely seal connection between the sample container and the linking channel.

3. The apparatus of claim 1, wherein the grinding rod includes a blade at the bottom end, and is configured to crush the solid specimen from granular to powder.

4. The apparatus of claim 3, wherein the grinding rod can be arranged with different blades consistent with a desired powder size of the solid specimen.

5. The apparatus of claim 3, wherein the grinding container includes a container and an outlet channel in which:
the container is attached to the linking channel from one end of the container and to the outlet channel from another end of the container, and configured to hold the solid specimen during grinding, and
the outlet channel is in contact with the blade of the grinding rod from one end of the outlet channel, and configured to allow the blade to pass through when the switch of the control unit is on.

6. The apparatus of claim 1, wherein the linking channel includes an opening, which is arranged to allow the grinding rod to pass through and to limit air interaction during transferring of the solid specimen from the sample holder to the grinding unit.

7. The apparatus of claim 1, wherein the linking channel is made of flexible materials to seal connection of the sample holder to the grinding unit from air interaction and to prevent waste and contamination of the solid specimen.

8. The apparatus of claim 1, wherein the supporting rod is arranged to secure the grinding rod to maintain linear motion.

9. The apparatus of claim 1, wherein the structural cover is made of nonconductive materials, and configured to provide safety to a user.

10. The apparatus of claim 1, wherein the structural cover is distant from the grinding unit to prevent direct contact between a user and the solid specimen during sampling when dealing with a hazardous specimen.

11. The apparatus of claim 1, wherein the switch includes an ON and an OFF key, and is connected to start and end grinding and dispensing of the solid specimen.

12. The apparatus of claim 1, wherein the control unit is in contact with the actuator motor to send regulating signals thereto.

13. The apparatus of claim 1, wherein the control unit includes a timer, and is configured to operate based on a desired amount of the solid specimen.

14. The apparatus of claim 13, wherein the timer is of a type selected from the group consisting of a mechanical timer and a digital timer.

15. The apparatus of claim 13, wherein the timer is adjusted based on a conversion between time and weight to display the desired amount of the solid specimen in weight.

16. The apparatus of claim 13, wherein the control unit is configured to adjust voltage of the actuator motor consistent with weight of the solid specimen.

17. The apparatus of claim 1, including an electronic board that is in contact with the actuator motor, and includes a light source controlled to stay on so as to keep a user alert during grinding of the solid specimen to avoid human errors and to add procedural safety during sampling.

18. A method of automatic gravimetric sampling for a solid specimen comprising:
calibrating a controller based on a base voltage of an actuator motor, the controller being in contact with the actuator motor, and being secured to a supporting frame of a structural support unit;
scaling a timer of the regulating module from the prior calibration;
adjusting the timer to a desired weight of the solid specimen for sampling;
attaching a sample holder containing the solid specimen to a linking channel, the linking channel being sealed to a cap of the sample holder from one end and to a grinding unit from another end, the grinding unit including a grinding rod and a grinding container;
inverting the sampling holder to transfer the solid specimen to the grinding container through the linking channel;
grinding the solid specimen inside the grinding container with a blade at a bottom end of the grinding rod by turning on a switch, the grinding rod being in contact with the grinding container from the bottom end and connected to a lever beam from a top end, the lever beam being connected to a rotational plate surrounding the actuator motor, and being configured to transform rotational motion of the rotational plate into linear motion of the grinding rod;
controlling the grinding of the solid specimen using the switch, the switch being in contact with the controller and the actuator motor, and being secured to the supporting frame; and
cleaning the sample holder, the grinding unit and the linking channel with distilled water after each sampling use to prevent chemical reactions with the solid specimen.

19. The method of sampling a solid specimen of claim 18, wherein the sampling is arranged with a precision of 0.03 gr to avoid procedural errors including human errors.

* * * * *